United States Patent
Zaitsev et al.

(10) Patent No.: US 10,134,137 B2
(45) Date of Patent: Nov. 20, 2018

(54) REDUCING STORAGE USING COMMONALITIES

(71) Applicant: LENOVO (Singapore) PTE. LTD., New Tech Park (SG)

(72) Inventors: Grigori Zaitsev, Durham, NC (US); Russell Speight VanBlon, Raleigh, NC (US); Jianbang Zhang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 1 day.

(21) Appl. No.: 15/336,647

(22) Filed: Oct. 27, 2016

(65) Prior Publication Data
US 2018/0122080 A1    May 3, 2018

(51) Int. Cl.
*G06K 9/00* (2006.01)
*G06T 7/00* (2017.01)
*G06T 17/00* (2006.01)

(52) U.S. Cl.
CPC .......... *G06T 7/0097* (2013.01); *G06T 17/00* (2013.01); *G06T 2207/10004* (2013.01); *G06T 2207/20144* (2013.01); *G06T 2207/20221* (2013.01); *H04N 2201/0084* (2013.01); *H04N 2201/3253* (2013.01)

(58) Field of Classification Search
None
See application file for complete search history.

(56) References Cited

U.S. PATENT DOCUMENTS

| 8,508,605 | B2 | 8/2013 | Dolgin et al. | |
|---|---|---|---|---|
| 2006/0002611 | A1 | 1/2006 | Mantiuk et al. | |
| 2006/0083421 | A1* | 4/2006 | Weiguo | G06K 9/32 382/154 |
| 2011/0242123 | A1 | 10/2011 | Momosaki et al. | |
| 2013/0135295 | A1* | 5/2013 | Li | G06T 19/006 345/419 |
| 2014/0314322 | A1* | 10/2014 | Snavely | G06K 9/00664 382/190 |
| 2015/0054975 | A1 | 2/2015 | Emmett et al. | |
| 2016/0034753 | A1* | 2/2016 | Harada | G06K 9/6828 382/229 |
| 2016/0125633 | A1* | 5/2016 | Windmark | G06T 3/4038 382/103 |
| 2016/0241817 | A1 | 8/2016 | Sun et al. | |
| 2016/0295064 | A1 | 10/2016 | Li | |

OTHER PUBLICATIONS

U.S. Appl. No. 14/674,390, "Notice of Allowance and Fees Due", dated Dec. 14, 2017, pp. 1-15.

* cited by examiner

Primary Examiner — Stephen P Coleman
(74) Attorney, Agent, or Firm — Kunzler, PC

(57) ABSTRACT

Apparatuses, methods, systems, and program products are disclosed for reducing storage using commonalities. One or more features that are common among each of a plurality of images is determined. One or more background images are generated based on the one or more common features. The one or more background images are used to recreate each of the plurality of images. One or more common features are modified in each image of the plurality of images prior to saving each image. Each of the plurality of images with the modified features is a foreground image.

18 Claims, 6 Drawing Sheets

REDUCING STORAGE USING COMMONALITIES

FIELD

The subject matter disclosed herein relates to computer storage and more particularly relates to reducing storage using commonalities.

BACKGROUND

Images, videos, and other media requires storage space to store on a device. Some devices, such as smart phones that are capable of taking images or videos, may not be equipped with large amounts of storage space. Some cloud services may be available to allow users to store images and videos in the cloud; however, storing content on a cloud server requires a network connection, which may not always be available, and some cloud services may downgrade the quality of the images and/or videos before they are stored.

BRIEF SUMMARY

An apparatus for reducing storage using commonalities is disclosed. A method and computer program product also perform the functions of the apparatus. In one embodiment, an apparatus includes a processor and a memory that stores code executable by the processor. In certain embodiments, the code is executable by the processor to determine one or more features that are common between each image of a plurality of images.

In some embodiments, the code is executable by the processor to generate one or more background images based on the one or more common features. The one or more background images may be used to recreate each of the plurality of images. In further embodiments, the code is executable by the processor to modify the one or more common features in each of the plurality of images prior to saving each image. Each of the plurality of images is a foreground image.

In some embodiments, the code is further executable by the processor to recreate an image of the plurality of images by combining a particular foreground image with one or more background images associated with the foreground image. In various embodiments, the code is further executable by the processor to receive a new image, determine one or more features of the new image, select one or more existing background images that correspond to the one or more features of the new image, modify the one or more features of the new image prior to saving the new image, and associate the one or more existing background images with the new image.

In some embodiments, the code is further executable by the processor to select the one or more existing background images based on one or more characteristics of the new image. The one or more characteristics may include a location where the new image was captured, a time of day when the new image was captured, and weather conditions when the new image was captured.

In one embodiment, the code is further executable by the processor to generate a three-dimensional ("3D") model of the one or more common features based on the background images. At least a portion of the 3D model may be selected to create a background image for an image based on one or more features of the image corresponding to one or more features of the portion of the 3D model. In certain embodiments, at least a portion of the 3D model that is selected to create the background image of the image is selected based on one or more of a location where the image was captured and a direction that the camera was pointed to capture the image.

In various embodiments, the location is determined based on global positioning system ("GPS") data associated with the image, and wherein the direction that the camera was pointed is determined based on compass data associated with the image. In one embodiment, the 3D model comprises one of a 3D model of a scene and a 3D model of a particular object within the scene. In some embodiments, the 3D model is further generated based on one or more background images associated with a plurality of different users. In one embodiment, the one or more background images are stored in a central repository.

In a further embodiment, the code is further executable by the processor to receive input from a user that specifies one or more common features of an image of the plurality of images that should remain in the foreground image. In some embodiments, the code is further executable by the processor to compress the one or more background images and each of the foreground images.

A method, in one embodiment, includes determining, by use of a processor, one or more features that are common between each image of a plurality of images. In a further embodiment, the method includes generating one or more background images based on the one or more common features. The one or more background images may be used to recreate each of the plurality of images. In various embodiments, the method includes modifying the one or more common features in each of the plurality of images prior to saving each image. In some embodiments, each of the plurality of images is a foreground image.

In various embodiments, the method includes recreating an image of the plurality of images by combining a particular foreground image with one or more background images associated with the foreground image. In certain embodiments, the method includes receiving a new image, determining one or more features of the new image, selecting one or more existing background images that correspond to the one or more features of the new image, modifying the one or more features of the new image prior to saving the new image, and associating the one or more existing background images with the new image.

In certain embodiments, the method includes selecting the one or more existing background images based on one or more characteristics of the new image. The one or more characteristics may include a location where the new image was captured, a time of day when the new image was captured, and weather conditions when the new image was captured.

In one embodiment, the method includes generating a three-dimensional ("3D") model of the one or more common features based on the background images. At least a portion of the 3D model may be selected to create a background image for an image based on one or more features of the image corresponding to one or more features of the portion of the 3D model.

In some embodiments, the at least a portion of the 3D model that is selected to create the background image of the image is selected based on one or more of a location where the image was captured and a direction that the camera was pointed to capture the image. The location may be determined based on global positioning system ("GPS") data associated with the image, and the direction that the camera was pointed may be determined based on compass data associated with the image.

In certain embodiments, the 3D model is further generated based on one or more background images associated with a plurality of different users. The one or more background images may be stored in a central repository.

A program product, in one embodiment, includes a computer readable storage medium that stores code executable by a processor. In some embodiments, the executable code includes code to perform determining, by use of a processor, one or more features that are common between each image of a plurality of images. In a further embodiment, the executable code includes code to perform generating one or more background images based on the one or more common features. The one or more background images may be used to recreate each of the plurality of images. In various embodiments, the executable code includes code to perform modifying the one or more common features in each of the plurality of images prior to saving each image. In some embodiments, each of the plurality of images is a foreground image.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
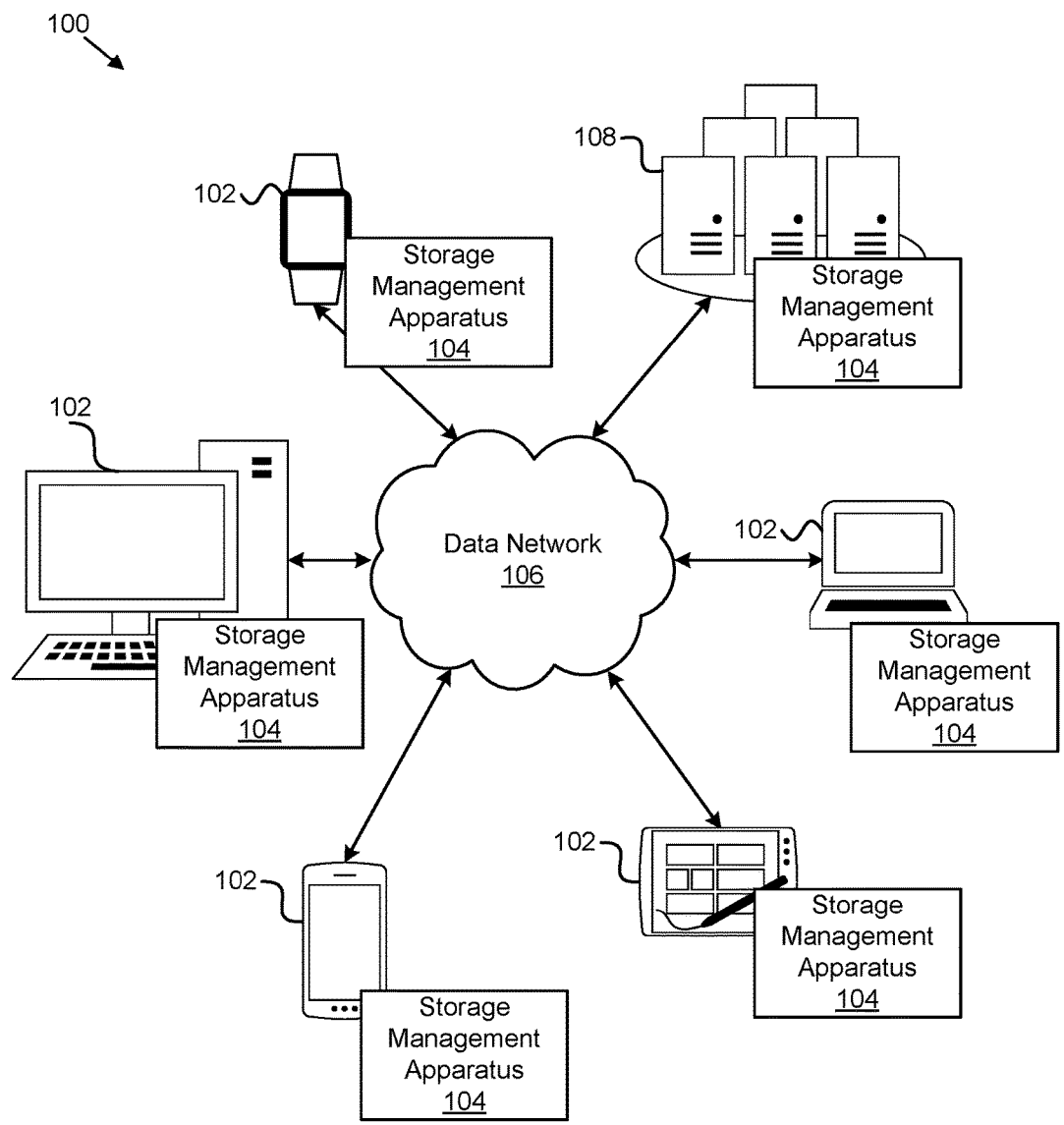
FIG. 1 is a schematic block diagram illustrating one embodiment of a system for reducing storage using commonalities.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of a system 100 for reducing storage using commonalities. In one embodiment, the system 100 includes one or more information handling devices 102, one or more storage management apparatuses 104, one or more data networks 106, and one or more servers 108. In certain embodiments, even though a specific number of information handling devices 102, storage management apparatuses 104, data networks 106, and servers 108 are depicted in FIG. 1, one of skill in the art will recognize, in light of this disclosure, that any number of information handling devices 102, storage management apparatuses 104, data networks 106, and servers 108 may be included in the system 100 for gesture detection.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108. The information handling devices 102 may include one or more sensors for detecting individuals, faces, movements, sounds, vibrations, and/or the like. In some embodiments, the information handling devices 102 include digital cameras for capturing videos and/or still photography.

In one embodiment, the storage management apparatus 104 is configured to determine common features between different images or video frames, such as common background features, and reuse the common features for each image so that the common features can be modified in each image when it is saved to reduce the amount of storage required to store each image, e.g., when the image is compressed. The storage management apparatus 104, in one embodiment, determines one or more features that are common between each image of a plurality of images, generates one or more background images based on the one or more common features, and modifies the one or more common features in each of the plurality of images prior to saving each image. The storage management apparatus 104, including its various sub-modules, may be located on one or more information handling devices 102 in the system 100, one or more servers 108, one or more network devices, and/or the like. The storage management apparatus 104 is described in more detail below with reference to FIGS. 2 and 3.

In one embodiment, the storage management apparatus 104 improves the functionality and/or usability of the computer, computing technology, computing environment, or the like, by determining various features of an image or video frame, e.g., by using image processing techniques and methods, and modifying the common features in the image so that the storage space required to store the image can be reduced, e.g., when the image is compressed. One or more background images may be generated using the common features so that when the image is viewed by a user, the image with the modified or "removed" common features is overlaid or combined with a background image to reconstruct the original image.

In various embodiments, the storage management apparatus 104 may be embodied as a hardware appliance that can be installed or deployed on an information handling device 102, on a server 108, or elsewhere on the data network 106. In certain embodiments, the storage management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the storage management apparatus 104 may include a power interface, a wired and/or wireless network interface, a graphical interface that attaches to a display, and/or a semiconductor integrated circuit device as described below, configured to perform the functions described herein with regard to the storage management apparatus 104.

The storage management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the storage management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the storage management apparatus 104.

The semiconductor integrated circuit device or other hardware appliance of the storage management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the storage management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers 108 may be communicatively coupled (e.g., networked) over a data network 106 to one or more information handling devices 102. The one or more servers 108 may store data associated with an information handling device 102, with a user, and/or the like. For example, a server 108 may store images, code for performing image processing functions, and/or the like.

Figure 2:
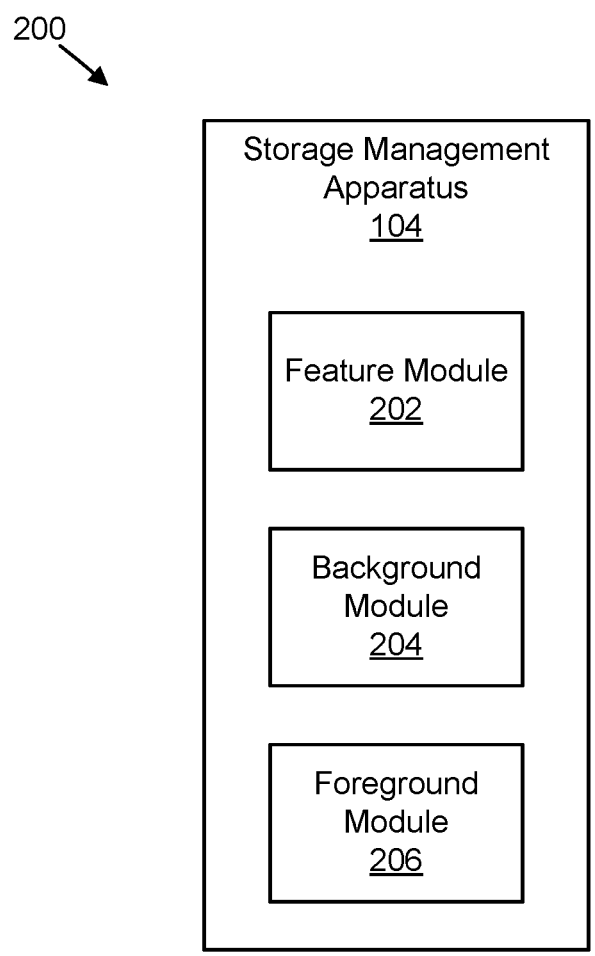
FIG. 2 is a schematic block diagram illustrating one embodiment of an apparatus for reducing storage using commonalities.

FIG. 2 is a schematic block diagram illustrating one embodiment of an apparatus 200 for reducing storage using commonalities. In one embodiment, the apparatus 200 includes an embodiment of a storage management apparatus 104. The storage management apparatus 104, in some embodiments, includes one or more of a feature module 202, a background module 204, and a foreground module 206, which are described in more detail below.

The feature module 202, in one embodiment, determines one or more features that are common between each image of a plurality of images. The plurality of images may be different still images, different frames of a video, and/or the like. The common features may include background items, such as scenery (e.g., mountains, trees, and/or the like), monuments, landmarks, buildings, statues, faces, people, clothing, hair, pets, and/or the like. The feature module 202 determines features among a plurality of different images that are common to each image using image processing methods and techniques, such as edge detection, facial recognition, pattern matching, and/or the like.

In some embodiments, the feature module 202 may calculate or check differences, e.g., pixel values such as RGB or grayscale values, between corresponding pixels of each of the plurality of images to determine features that are common between each of the images. For example, the feature module 202 may determine that an image that has the Eiffel Tower in the background and an image that has a different landmark in the background do not share any common features based on the differences in the pixel values between the images.

In some embodiments, the feature module 202 may select the plurality of images from an image library, a data store, a local storage location, a remote or cloud storage location, and/or the like. For example, the feature module 202 may select a plurality of images from a local storage location on the user's smart phone. In another example, the feature module 202 may select a plurality of images from a single user's, or multiple users', photo sharing or storage site, such as Google Photos®, Facebook®, or the like.

In some embodiments, the feature module 202 selects images that are taken within a predefined time period of one another based on timestamps stored in metadata of each image. For example, the feature module 202 may select images that are taken within 500 milliseconds of each other. It may be likely that images that are taken within a short period of time of one another will share common features because the images were probably taken at the same location and do not have much movement between each image, e.g., such as a set of images taken in a "burst mode" image capture mode.

In a further embodiment, the feature module 202 selects images that are taken at the same location based on location data, e.g., GPS data, stored in metadata of each image. Furthermore, the location data may include compass data that indicates the direction that the camera was facing when the image was captured. It may be likely that images that are taken at the same location and/or in the same direction will share common features.

The background module 204, in one embodiment, generates one or more background images based on the one or more common features. For example, if each image of the plurality of images is each in front of a landmark, such as the Eiffel Tower, the background module 204 may create a background image that is just an image of the Eiffel Tower. In other words, the background image may be the original image with one or more features that are not common among the plurality of images removed from the image. Thus, if a series of five images of a person are captured in front of the Eiffel Tower within a short period of time, e.g., five images captured in a "burst mode" image capture mode, the background module 204 may generate a single image that contains the image of the Eiffel Tower as it is depicted in the original images.

The background module 204 may create a new image file or object, for example, and copy the pixel data representing the common features from the original images to the new image file. The other pixels that do not contain pixel data representing the common features may remain unused, reserved, or the like such that they do not use unnecessary storage space. For example, the pixel data for the unused pixels may be assigned values that can be compressible, and therefore will not consume much storage space when saved.

In some embodiments, there may be minor differences between pixel values for the common features depicted in each of the plurality of images. For example, a set of images taken in "burst mode" may be slightly different due to slight movements of the camera. In such an embodiment, the background module 204 may use an average, a median, a mode, or the like, of the pixel values that represent the common features in each of the plurality of images for the pixel values of the pixels depicting the common features in the generated background image(s).

In some embodiments, the background module 204 creates a separate background image for each common feature. For example, if multiple images include the Eiffel Tower and a statue in the background, the background module 204 may create a background image of the Eiffel Tower and a different background image for the statue. When recreating the image, the foreground image associated with the background images may be overlaid each background image. In a further embodiment, the background module 204 creates one or more background images that include multiple common features. Thus, instead of creating a different background image for the Eiffel Tower and for the statue, the background module 204 may create a single background image that includes both the Eiffel Tower and the statue.

In some embodiments, the foreground module 206 modifies the one or more common features in each of the plurality of images prior to saving the images such that each image, without the common features, is a foreground image. As described in the example above, the foreground images may be the images of the person with the Eiffel Tower removed from the background, or modified in such a way that the Eiffel Tower is not noticeable or clear in the background, and the background module 204 may generate a single background image that is associated with each of the foreground images such that when one or more of the images is viewed by a user, the foreground image can be overlaid onto the background image to reconstruct the original image. In this manner, each of the plurality of images requires less storage space to store because the data representing the common features has been removed from or modified in the images and recreated or copied to a smaller set of background images.

The foreground module 206, in some embodiments, uses one or more image processing techniques or methods to modify or remove the common features from each of a plurality of images. For example, the foreground module 206 may determine the common features, or may receive an indication of the common features from the feature module 202, and may remove the pixel data representing the common features, may modify, alter, or change the pixel data representing the common features, e.g., to make the pixel data more compressible or to make the pixel data better satisfy one or more compression algorithms, may prepare the pixel data representing the common features for compression, e.g., by changing RGB or brightness values for each pixel, and/or the like.

In certain embodiments, the foreground module 206, maintains or adds some information in the pixel data of the modified pixels of the common features that can be used to restore the background image accurately, but still requires less storage space when the foreground image is compressed. For example, the foreground module 206 may maintain the RGB values for each pixel, may maintain the brightness values for each pixel, and/or the like, while modifying other pixel data so that the common features, when compressed, require less storage space than the original image.

In some embodiments, when a new image is captured by a device, the feature module 202 determines one or more features of the new image, and the background module 204 selects one or more existing background images that correspond to the one or more features of the new image. Continuing with the example above, if a different user captures a picture of himself in front of the Eiffel Tower, the feature module 202 may determine various features or objects within the image, such as the Eiffel Tower, and the background module 204 may select one or more existing background images to associate with the image that depict the same or substantially similar image of the Eiffel Tower. For example, the background module 204 may select one or more existing background images based on the pixel values for the pixels representing the Eiffel Tower, the time of day that the image was captured, the location where the image was captured, the direction the camera was pointing when the image was captured, and/or the like.

The foreground module 206 may then remove the Eiffel Tower from the image prior to saving the image by modifying the pixels representing the Eiffel Tower to generate a foreground image so that when the image is saved and/or compressed it requires less storage space to store the image because the modified pixels representing the Eiffel Tower can be better compressed. When the image is viewed later, the foreground image, e.g., the image with the Eiffel Tower removed, may be overlaid onto the background image of the Eiffel Tower that is associated with the foreground image such that the image appears to be the originally captured image.

Figure 3:
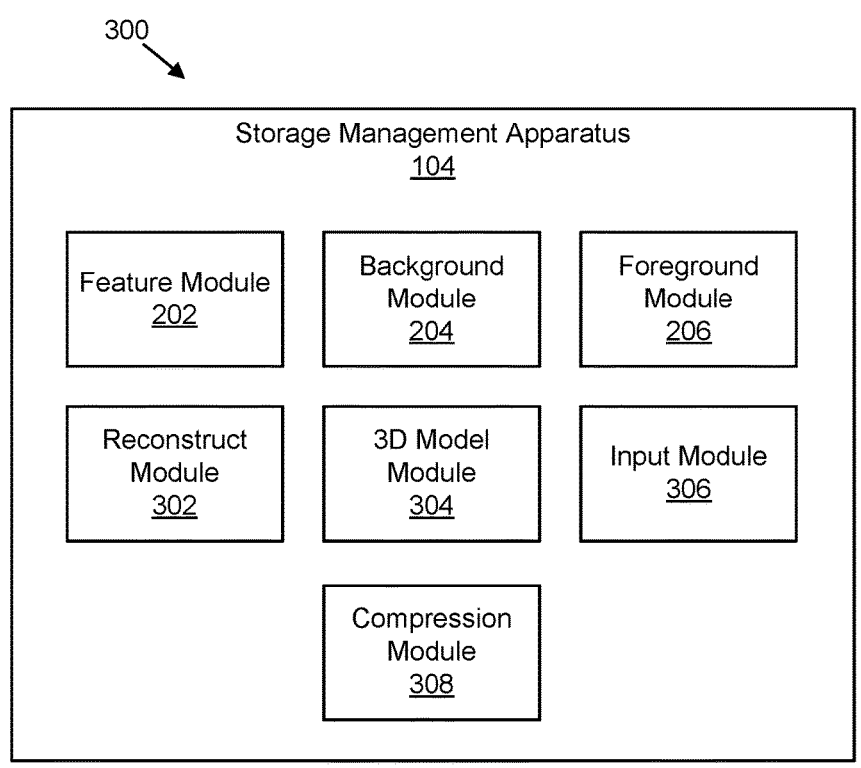
FIG. 3 is a schematic block diagram illustrating one embodiment of another apparatus for reducing storage using commonalities.

FIG. 3 is a schematic block diagram illustrating one embodiment of an apparatus 300 for reducing storage using commonalities. In one embodiment, the apparatus 300 includes an embodiment of a storage management apparatus 104. The storage management apparatus 104, in some embodiments, includes one or more of a feature module 202, a background module 204, and a foreground module 206, which are substantially similar to the feature module 202, the background module 204, and the foreground module 206 described above with reference to FIG. 2. In a further embodiment, the storage management apparatus 104 includes one or more of a reconstruct module 302, a 3D model module 304, an input module 306, and a compression module 308, which are described in more detail below.

The reconstruct module 302, in one embodiment, recreates an image by combining a foreground image with one or more background images associated with the foreground image. For example, the reconstruct module 302 may determine each background image that is associated with a foreground image and layer the images such that the foreground image is the top layer and the background images are layered below the foreground image. In another example, the reconstruct module 302 may extract the compressed image data of the foreground image and/or the one or more background images associated with the foreground image, and copy the pixel data from the background images back to the foreground image to recreate the original image. The reconstruct module 302 may create a final image based on the combination of the foreground image and the background image(s).

In some embodiments, the reconstruct module 302 may maintain, manage, and/or otherwise create a mapping of foreground images to one or more background images that are associated with the foreground image. For example, a foreground image and each of the background images associated with the foreground image may be assigned a unique identifier. The reconstruct module 302 may create a mapping of the foreground image identifiers to the background image identifiers for the background images that are associated with the foreground image. The mapping may be embodied as a tree, a table, a list, and/or the like.

The mapping may also include information about a background image's position in the image when reconstructed. For example, if an image has a foreground image and three background images, each of the background images may be assigned a layer number or a position indicator that indicates which layer or position, or in which order, the background images should be reconstructed, e.g., layer 1, layer 2, or layer 3, behind or underneath the foreground image. In this manner, the reconstruct module 302 can recreate the original image such that it appears exactly or substantially similar to the original image using the foreground image and one or more background images, which may be associated with multiple different foreground images.

The 3D model module 304, in one embodiment, generates a 3D model of the common features based on a plurality of background images. For example, an image repository may comprise multiple images that include the Eiffel Tower in the background from various perspectives, locations, directions, or the like, and under different time and weather conditions. The 3D model module 304 may use the metadata associated with each background image, which may describe the location where the image was taken from, the direction in which the camera was pointing to capture the image, the time of day that the image was taken, the image's resolution, and/or the like, to stitch together a 3D model of the Eiffel Tower from a plurality of different background images.

In a further embodiment, the 3D model module 304 may reference a weather service, or the like, using the date and time-of-day that the image was taken to determine weather conditions for the image so that the 3D model of the Eiffel Tower, for example, can be created using images that have similar weather characteristics, e.g., rain, sun, snow, etc. Thus, the 3D model module 304 may generate multiple different 3D models of the same object, scene, or the like under various conditions, e.g., based on the time of day, based on different weather conditions, from different distances away from the object, from different view angles of the object, and/or the like.

Accordingly, in one embodiment, the 3D model module 304 and/or the background module 204 creates, selects, or associates a background image for a captured image, when being reconstructed or stored, for example, based on one or more features of the captured image that correspond to one or more features of a portion of the 3D model. For example, if the captured image was taken as a certain GPS location, at a particular time, and at a particular direction, as determined by the metadata for the captured image, the 3D model module 304 may select a portion of a 3D model that is constructed of background images that have corresponding characteristics (e.g., background images that were taken from the same or substantially the same GPS location, time, and/or direction) to create or recreate a background image for the captured image.

The input module 306, in one embodiment, receives input from a user that specifies one or more common features of an image that should remain as part of the foreground image. For example, a user may specify certain objects, persons, features, or the like within an image that should remain in the foreground image and not be removed to a background image or otherwise modified. A user may, for example, use a touch screen of a digital camera to select different objects that should remain in the foreground image. In this manner, the user can select objects that may change over time, such as pictures on a wall, trees and other foliage, and/or the like to remain in the foreground image, while other objects that remain fixed over time, such as monuments, statues, landmarks, or the like, can be removed from the foreground image, by modifying the pixels representing the objects, and saved to a background image.

The compression module 308, in one embodiment, compresses one or more of the foreground image and the background images associated with a foreground image. For example, the compression module 308 may apply a lossy (e.g., JPEG, GIF) and/or lossless (e.g., RAW, BMP, PNG) compression algorithm on a foreground image and/or one or more background images associated with the foreground image. For example, the foreground module 206 may modify the pixel data representing the common features of an image to prepare the pixel data for a particular compression algorithm. In certain embodiments, the same compression algorithm that is applied to a foreground image is applied to the background images associated with the foreground image so that the compression ratios, image resolutions, image qualities, and/or the like are consistent.

Figure 4:
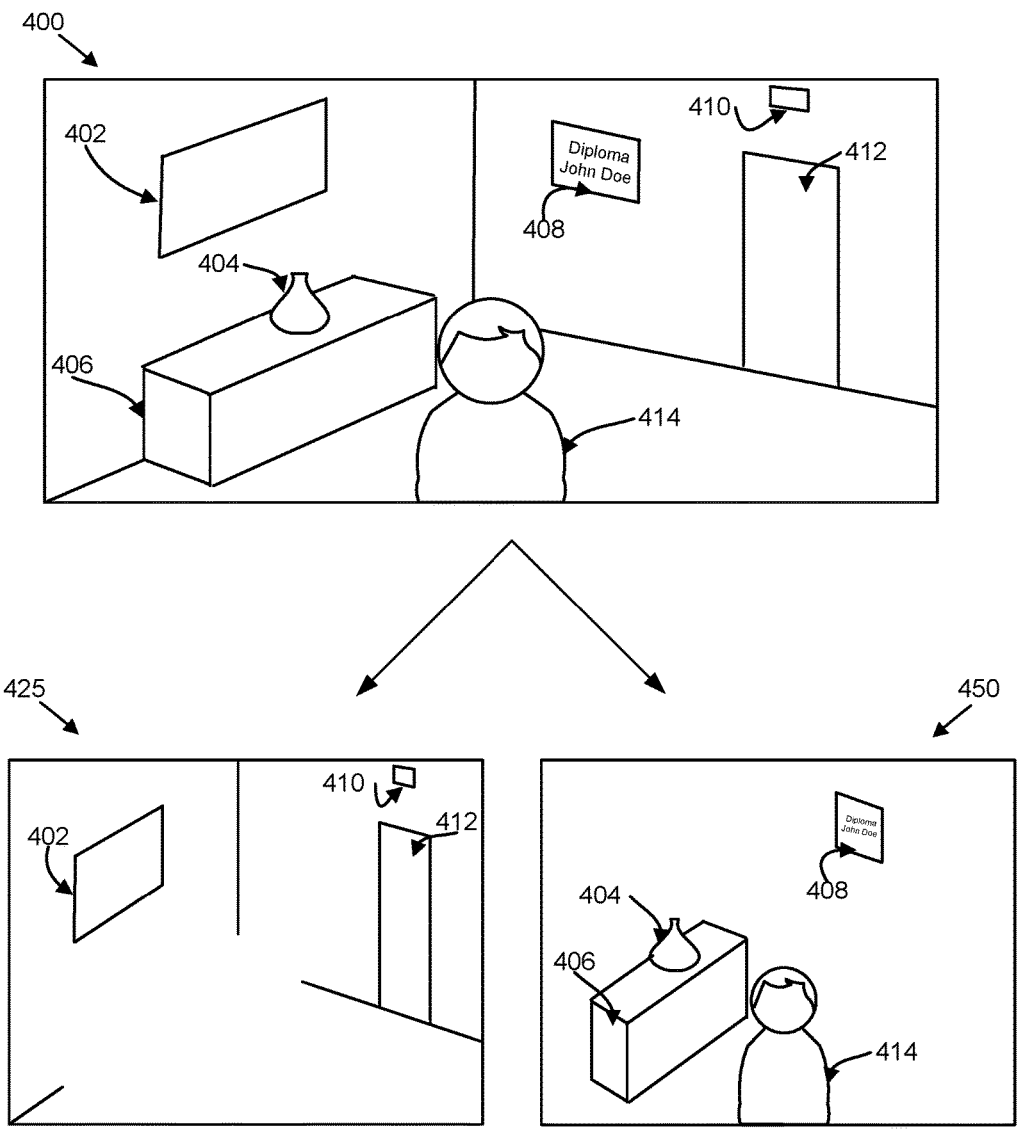
FIG. 4 is a schematic block diagram illustrating one example embodiment of reducing storage using commonalities.

FIG. 4 is a schematic block diagram illustrating one embodiment of an example embodiment for reducing storage using commonalities. In one embodiment, an image 400 is captured using a digital camera, a camera for a smartphone, and/or the like. The image 400 may include a number of different features or objects such as a window 402, a vase 404, a table 406, a picture 408, a vent 410, a door 412, and a person 414.

The feature module 202 may identify the features 402-414 in the image, using edge detection, feature recognition, facial recognition, and/or the like. The background module 204 may search an image library or database to determine one or more background images that correspond to the objects in the image. The background module 204, for example, may find one or more background images that are taken at the same location, in the same direction, at the same time, or the like. Accordingly, the background module 204 may find one or more background images of the window 402, the vase 404, the table 406, the picture 408, the vent 410, and/or the door 412.

In another embodiment, to identify the various background images, the background module 204 may reference a 3D model of the scene where the image was captured, one or more objects 402-412 within the scene, and/or the like, based on the location metadata, the direction metadata, and/or the like. Accordingly, the background module 204 may select a background image 425 that includes one or more features or objects from the original image 400, such as the window 402, the door 412, and the vent 410.

As described above, the input module 306 may receive input from a user that specifies which objects or features to modify in the original image 400 and place, e.g., copy the original pixel values from the foreground image, in the background image 425. In this example, the user may have selected the window 402, the vent 410, and the door 412, by touching the objects on a touch-screen display of a camera, for example, because those features are most likely to stay constant between different images. The other objects, e.g., the vase 404, the table 406, and the picture 408 may change or move over time, and therefore the user may not select them for removal from or modification in the image 400, but instead would like them to remain in the foreground image 450, along with the image of the person 414.

The compression module 308 may compress both the background image 425, if it is a new background image, and the foreground image 450. If the background module 204 finds or identifies a background image 425 that has already been created that includes the features/objects in the image 400, and selected by the user, e.g., a background image 425 that may have been previously created by another user in the same location and pointed in the same direction, the background module 204 and/or the reconstruct module 302 may associate the foreground image 450 with the existing background image 425, using a mapping table as described above. Accordingly, when the image 400 is viewed later, the reconstruct module 302 may take the foreground image 450, determine which background image(s) 425 is/are associated with the foreground image 450, and overlay the foreground image 425 on the background image 425, or copy the pixel values from the background image back to the foreground image, so that it appears to the user as the original image 400.

Figure 5:
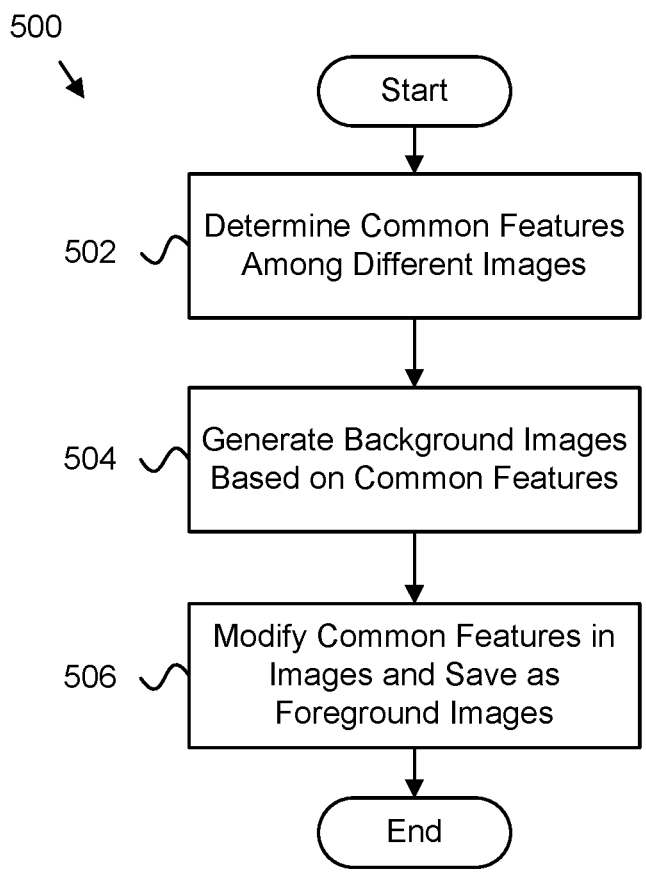
FIG. 5 is a schematic flow chart diagram illustrating one embodiment of a method for reducing storage using commonalities.

FIG. 5 is a schematic flow chart diagram illustrating one embodiment of a method for reducing storage using commonalities. In one embodiment, the method 500 begins and determines 502 one or more features that are common between each image of a plurality of images. The method 500, in a further embodiment, generates 504 one or more background images based on the one or more common features. The one or more background images, in some embodiments, are used to recreate each of the plurality of images. The method 500, in various embodiments, modifies 506 the one or more common features from each of the plurality of images prior to saving each image, e.g., so that the common features are not noticeable. In some embodiments, each of the plurality of images, without the common features, is a foreground image, and the method 500 ends. In certain embodiments, the feature module 202, the background module 204, and the foreground module 206 perform each of the various steps of the method 500.

Figure 6:
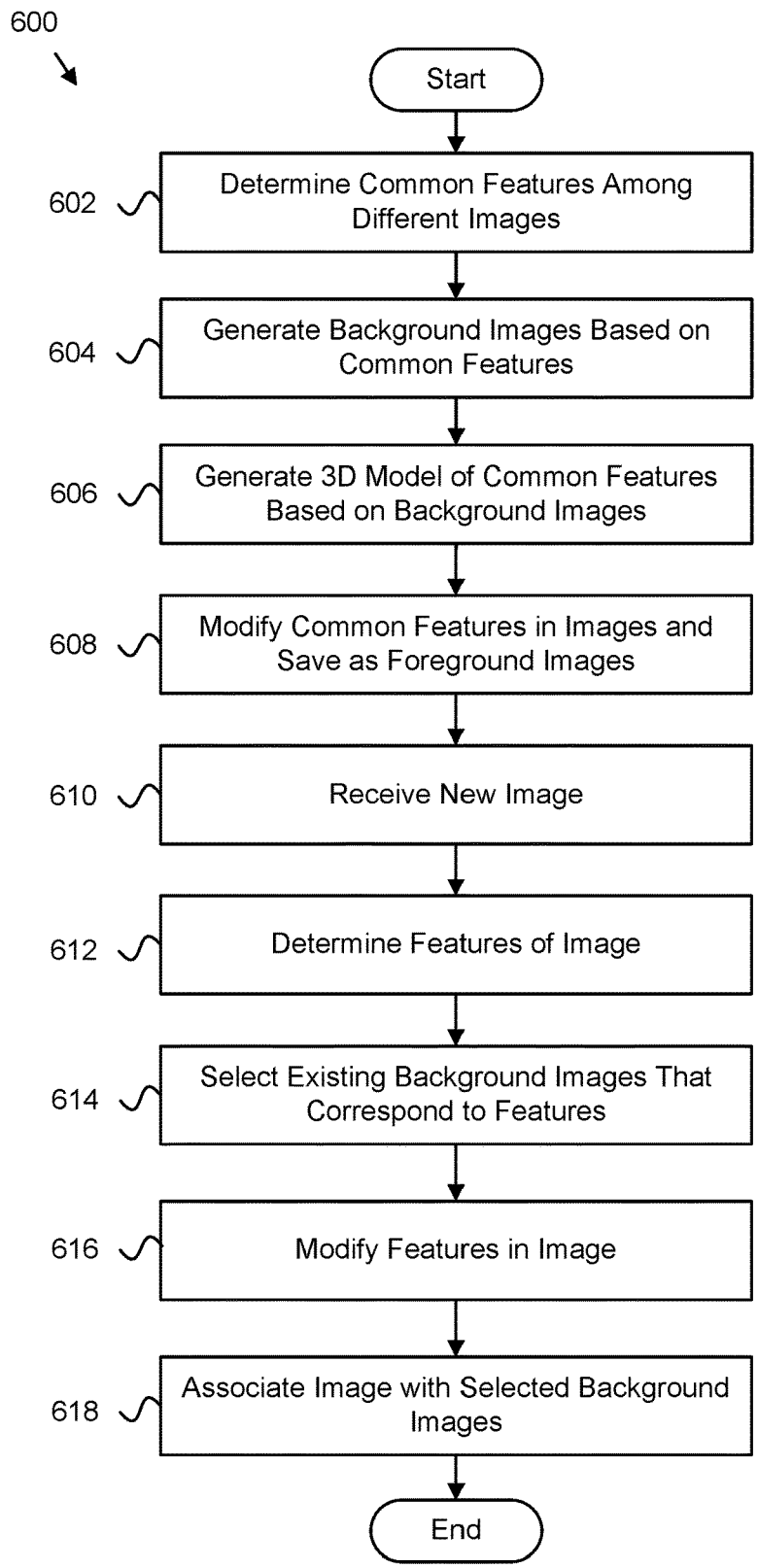
FIG. 6 is a schematic flow chart diagram illustrating one embodiment of another method for reducing storage using commonalities.

FIG. 6 is a schematic flow chart diagram illustrating one embodiment of another method 600 for reducing storage using commonalities. In one embodiment, the method 600 begins and determines 602 one or more features that are common between each image of a plurality of images. The method 600, in a further embodiment, generates 604 one or more background images based on the one or more common features. The one or more background images, in some embodiments, are used to recreate each of the plurality of images.

In some embodiments, the method 600 generates 606 a 3D model of the one or more common features based on the background images. In some embodiments, at least a portion of the 3D model is selected to create a background image for an image based on one or more features of the image corresponding to one or more features of the portions of the 3D model. In certain embodiments, the method 600 modifies 608 the one or more common features in each of the plurality of images prior to saving each image. In some embodiments, each of the plurality of images, without the common features, is a foreground image.

In various embodiments, the method 600 receives 610 a new image and determines 612 one or more features or objects within the new image. The method 600, in a further embodiment, selects 614 one or more existing background images that correspond to the features of the new image. For example, the method 600 may select 614 one or more background images that correspond to the features of the new image based on a location where the new image was taken, a direction in which the new image was taken from, the weather conditions that the new image was taken in, the time of day that the new image was taken, a resolution of the new image, and/or the like.

In certain embodiments, the method 600 modifies 616 the pixels representing the features that correspond to the selected background images from the new image to create a foreground image. The method 600, in a further embodiment, associates 618 the foreground image with the one or more selected background images so that the new image can be reconstructed with the foreground image and the one or more background images when it is viewed, and the method 600 ends. In certain embodiments, the feature module 202, the background module 204, the foreground module 206, the reconstruct module 302, the 3D model module 304, the input module 306, and/or the compression module 308 perform each of the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   determine one or more features that are common between each image of a plurality of images;
   generate one or more background images based on the one or more common features, the one or more background images used to recreate each of the plurality of images;
   modify the one or more common features in each of the plurality of images prior to saving each image so that each of the plurality of images requires less storage space to store, each of the plurality of images comprising a foreground image;
   receive a new image;
   determine one or more features of the new image;
   select one or more existing background images that correspond to one or more of the features of the new image;
   modify the one or more features of the new image that correspond to the one or more selected existing background images prior to saving the new image so that the image requires less storage space to store; and
   associate the selected one or more existing background images with the new image.

2. The apparatus of claim 1, wherein the code is further executable by the processor to recreate an image of the plurality of images by combining a particular foreground image with one or more background images associated with the foreground image.

3. The apparatus of claim 1, wherein the code is further executable by the processor to select the one or more existing background images based on one or more characteristics of the new image, the one or more characteristics comprising a location where the new image was captured, a time of day when the new image was captured, and weather conditions when the new image was captured.

4. The apparatus of claim 1, wherein the code is further executable by the processor to receive input from a user that specifies one or more common features of an image of the plurality of images that should remain in the foreground image.

5. The apparatus of claim 1, wherein the code is further executable by the processor to compress the one or more background images and each of the foreground images.

6. The apparatus of claim 1, wherein the code is further executable by the processor to generate a three-dimensional ("3D") model of the one or more common features based on the background images.

7. The apparatus of claim 6, wherein the 3D model comprises one of a 3D model of a scene and a 3D model of a particular object within the scene.

8. The apparatus of claim 6, wherein the 3D model is further generated based on one or more background images associated with a plurality of different users, the one or more background images stored in a central repository.

9. The apparatus of claim 6, wherein at least a portion of the 3D model is selected to create a background image for an image based on one or more features of the image corresponding to one or more features of the portion of the 3D model.

10. The apparatus of claim 9, wherein the at least a portion of the 3D model that is selected to create the background image of the image is selected based on one or more of a location where the image was captured and a direction that the camera was pointed to capture the image.

11. The apparatus of claim 10, wherein the location is determined based on global positioning system ("GPS") data associated with the image, and wherein the direction that the camera was pointed is determined based on compass data associated with the image.

12. A method comprising:
    determining, by use of a processor, one or more features that are common between each image of a plurality of images;
    generating one or more background images based on the one or more common features, the one or more background images used to recreate each of the plurality of images;
    modifying the one or more common features in each of the plurality of images prior to saving each image so that each of the plurality of images requires less storage space to store, each of the plurality of images comprising a foreground image;

receiving a new image;

determining one or more features of the new image;

selecting one or more existing background images that correspond to one or more of the features of the new image;

modifying the one or more features of the new image that correspond to the one or more selected existing background images prior to saving the new image so that the image requires less storage space to store; and associating the selected one or more existing background images with the new image.

13. The method of claim 12, further comprising recreating an image of the plurality of images by combining a particular foreground image with one or more background images associated with the foreground image.

14. The method of claim 12, further comprising selecting the one or more existing background images based on one or more characteristics of the new image, the one or more characteristics comprising a location where the new image was captured, a time of day when the new image was captured, and weather conditions when the new image was captured.

15. The method of claim 12, further comprising generating a three-dimensional ("3D") model of the one or more common features based on the background images, wherein at least a portion of the 3D model is selected to create a background image for an image based on one or more features of the image corresponding to one or more features of the portion of the 3D model.

16. The method of claim 15, wherein the at least a portion of the 3D model that is selected to create the background image of the image is selected based on one or more of a location where the image was captured and a direction that the camera was pointed to capture the image, the location determined based on global positioning system ("GPS") data associated with the image, and the direction that the camera was pointed is determined based on compass data associated with the image.

17. The method of claim 15, wherein the 3D model is further generated based on one or more background images associated with a plurality of different users, the one or more background images stored in a central repository.

18. A program product comprising a computer readable storage medium that is not a transitory signal and that stores code executable by a processor, the executable code comprising code to perform:

determining one or more features that are common between each image of a plurality of images;

generating one or more background images based on the one or more common features, the one or more background images used to recreate each of the plurality of images;

modifying the one or more common features in each of the plurality of images prior to saving each image so that each of the plurality of images requires less storage space to store, each of the plurality of images comprising a foreground image;

receiving a new image;

determining one or more features of the new image;

selecting one or more existing background images that correspond to one or more of the features of the new image;

modifying the one or more features of the new image that correspond to the one or more selected existing background images prior to saving the new image so that the image requires less storage space to store; and associating the selected one or more existing background images with the new image.

* * * * *